US009425640B2

(12) United States Patent
Moran

(10) Patent No.: US 9,425,640 B2
(45) Date of Patent: Aug. 23, 2016

(54) SYSTEM AND METHOD OF INDUCTIVE CHARGING AND LOCALIZATION THROUGH USING MULTIPLE PRIMARY INDUCTIVE COILS TO DETECT THE INDUCED VOLTAGE OF A SECONDARY INDUCTIVE COIL

(71) Applicant: THE CHARLES STARK DRAPER LABORATORY, INC., Cambridge, MA (US)

(72) Inventor: James E. Moran, Merrimack, NH (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 283 days.

(21) Appl. No.: 14/062,045

(22) Filed: Oct. 24, 2013

(65) Prior Publication Data
US 2015/0084585 A1    Mar. 26, 2015

Related U.S. Application Data

(60) Provisional application No. 61/882,855, filed on Sep. 26, 2013.

(51) Int. Cl.
*H02J 5/00*  (2016.01)
*H02J 17/00*  (2006.01)
*H02J 7/02*  (2016.01)

(52) U.S. Cl.
CPC ............... *H02J 7/025* (2013.01); *H02J 5/005* (2013.01); *H02J 17/00* (2013.01); *H02J 50/40* (2016.02); *H02J 50/90* (2016.02)

(58) Field of Classification Search
CPC ........... H02J 7/025; H02J 17/00; H02J 50/00; H02J 50/10; H02J 50/40; H02J 50/90

USPC .......................................... 320/108; 307/104
See application file for complete search history.

(56) References Cited

U.S. PATENT DOCUMENTS

| 4,100,472 A | * | 7/1978 | Mobley | G01S 3/44 318/685 |
| 4,536,696 A | * | 8/1985 | Ray | H02J 7/022 320/140 |

(Continued)

OTHER PUBLICATIONS

"Blanket for a bedsheet," Reedz, Instructables.com, Published Jun. 16, 2008, Accessed Oct. 7, 2015, http://web.archive.org/web/20120502054043/http://www.instructables.com/id/Blanket-for-a-bedsheet/?*

(Continued)

*Primary Examiner* — Robert Grant
*Assistant Examiner* — John Trischler
(74) *Attorney, Agent, or Firm* — Lando & Anastasi, LLP

(57) ABSTRACT

According one aspects, embodiments herein provide an inductive localization and charging system for detecting and charging a medical device comprising a plurality of primary inductive coils arranged within a dielectric material, an input connector coupled to the plurality of primary inductive coils and configured to receive input power, a controller coupled to the plurality of primary inductive coils and to the input connector, the controller configured to selectively activate each primary coil of the plurality of primary inductive coils, determine that a first primary coil of the plurality of primary inductive coils is within operable proximity of an external secondary coil located in the medical device, and control transfer of power between the primary coil and the secondary coil to charge the medical device.

12 Claims, 10 Drawing Sheets

(56) References Cited

U.S. PATENT DOCUMENTS

| | | | | |
|---|---|---|---|---|
| 5,371,835 A * | 12/1994 | Akamatsu | G06N 3/0635 | 706/26 |
| 5,467,718 A * | 11/1995 | Shibata | B60L 13/10 | 104/284 |
| 6,212,430 B1 * | 4/2001 | Kung | A61N 1/3787 | 607/61 |
| 6,366,817 B1 * | 4/2002 | Kung | A61N 1/3787 | 607/61 |
| 6,400,991 B1 * | 6/2002 | Kung | A61N 1/3787 | 607/33 |
| 6,566,862 B1 * | 5/2003 | Goto | G01D 3/0365 | 324/207.16 |
| 6,707,291 B2 * | 3/2004 | Goto | G01D 3/0365 | 324/207.16 |
| 6,845,018 B2 * | 1/2005 | Ohishi | H02M 3/33507 | 363/21.06 |
| 7,262,700 B2 * | 8/2007 | Hsu | H02J 7/025 | 336/118 |
| 7,378,817 B2 * | 5/2008 | Calhoon | G06F 1/26 | 320/106 |
| 7,521,890 B2 * | 4/2009 | Lee | H02J 5/005 | 320/108 |
| 7,650,192 B2 * | 1/2010 | Wahlstrand | A61M 5/14276 | 607/61 |
| 7,880,338 B2 * | 2/2011 | Jin | H02J 5/005 | 307/104 |
| 7,915,858 B2 * | 3/2011 | Liu | H01F 38/14 | 320/108 |
| 7,923,870 B2 * | 4/2011 | Jin | H02J 5/005 | 307/140 |
| 7,956,495 B2 * | 6/2011 | Jin | H02J 7/025 | 307/104 |
| 8,004,118 B2 * | 8/2011 | Kamijo | H02J 7/025 | 307/104 |
| 8,060,011 B2 * | 11/2011 | Jin | H02J 5/005 | 320/108 |
| 8,234,509 B2 * | 7/2012 | Gioscia | G06F 1/1632 | 320/107 |
| 8,285,388 B2 * | 10/2012 | Wahlstrand | A61M 5/14276 | 607/61 |
| 8,305,741 B2 * | 11/2012 | Chatterjee | G06F 1/1632 | 320/108 |
| 8,310,107 B2 * | 11/2012 | Jin | H02J 5/005 | 307/104 |
| 8,385,822 B2 * | 2/2013 | Chatterjee | G06F 1/1632 | 455/41.1 |
| 8,432,483 B2 * | 4/2013 | Chu | G03B 17/561 | 320/108 |
| 8,436,492 B2 * | 5/2013 | Jung | H02J 7/0027 | 307/104 |
| 8,446,046 B2 * | 5/2013 | Fells | H02J 5/005 | 307/104 |
| 2003/0078003 A1 * | 4/2003 | Hunter | A61B 5/06 | 455/41.1 |
| 2003/0102862 A1 * | 6/2003 | Goto | G01D 3/0365 | 324/207.16 |
| 2005/0068019 A1 * | 3/2005 | Nakamura | G06F 1/26 | 323/355 |
| 2006/0202665 A1 * | 9/2006 | Hsu | H02J 7/025 | 320/139 |
| 2007/0076459 A1 * | 4/2007 | Limpkin | H01F 38/14 | 363/157 |
| 2007/0129767 A1 * | 6/2007 | Wahlstrand | A61M 5/14276 | 607/33 |
| 2007/0145830 A1 * | 6/2007 | Lee | H02J 5/005 | 307/135 |
| 2007/0146351 A1 * | 6/2007 | Katsuhira | G06F 3/03545 | 345/179 |
| 2008/0136377 A1 * | 6/2008 | Zhang | H01M 10/44 | 320/137 |
| 2008/0197711 A1 * | 8/2008 | Kato | H01F 38/14 | 307/104 |
| 2009/0001932 A1 * | 1/2009 | Kamijo | H02J 5/005 | 320/108 |
| 2009/0001941 A1 * | 1/2009 | Hsu | H02J 7/025 | 323/211 |
| 2009/0038623 A1 * | 2/2009 | Farbarik | A61F 2/02 | 128/848 |
| 2009/0096413 A1 * | 4/2009 | Partovi | H01F 5/003 | 320/108 |
| 2009/0108805 A1 * | 4/2009 | Liu | H01F 38/14 | 320/108 |
| 2009/0153098 A1 * | 6/2009 | Toya | H02J 7/0045 | 320/108 |
| 2009/0184680 A1 * | 7/2009 | Kao | H01F 3/00 | 320/108 |
| 2010/0069992 A1 * | 3/2010 | Aghassian | A61N 1/37229 | 607/32 |
| 2010/0084918 A1 * | 4/2010 | Fells | H02J 5/005 | 307/32 |
| 2010/0114253 A1 * | 5/2010 | Wahlstrand | A61M 5/14276 | 607/61 |
| 2010/0179618 A1 * | 7/2010 | Marnfeldt | A61N 1/3727 | 607/60 |
| 2010/0187912 A1 * | 7/2010 | Kitamura | H02J 5/005 | 307/104 |
| 2010/0289457 A1 * | 11/2010 | Onnerud | H02J 7/0093 | 320/162 |
| 2011/0004278 A1 * | 1/2011 | Aghassian | A61N 1/3787 | 607/61 |
| 2011/0285210 A1 * | 11/2011 | Lemmens | H02J 5/005 | 307/104 |
| 2011/0291491 A1 * | 12/2011 | Lemmens | H02J 5/005 | 307/104 |
| 2012/0013293 A1 * | 1/2012 | Chu | H02J 7/025 | 320/108 |
| 2012/0013790 A1 * | 1/2012 | Chu | G03B 17/561 | 348/372 |
| 2012/0074899 A1 * | 3/2012 | Tsai | H02J 7/025 | 320/108 |
| 2012/0146576 A1 * | 6/2012 | Partovi | H01F 7/0252 | 320/108 |
| 2012/0153740 A1 * | 6/2012 | Soar | F41H 1/02 | 307/104 |
| 2012/0153893 A1 * | 6/2012 | Schatz | B60L 11/182 | 320/108 |
| 2012/0235636 A1 * | 9/2012 | Partovi | H02J 7/025 | 320/108 |
| 2012/0299389 A1 * | 11/2012 | Lee | H04B 5/0031 | 307/104 |
| 2013/0002038 A1 * | 1/2013 | Lee | H02J 7/00 | 307/104 |
| 2013/0005251 A1 * | 1/2013 | Soar | B60N 2/4876 | 455/41.1 |
| 2013/0057078 A1 * | 3/2013 | Lee | H02J 7/00 | 307/104 |
| 2013/0062961 A1 * | 3/2013 | Park | H02J 17/00 | 307/104 |
| 2013/0082647 A1 * | 4/2013 | Yoon | H02J 5/005 | 320/108 |
| 2013/0082649 A1 * | 4/2013 | Lee | H02J 17/00 | 320/108 |
| 2013/0093253 A1 * | 4/2013 | Norconk | H02J 5/005 | 307/104 |
| 2013/0096651 A1 | 4/2013 | Ozawa et al. | | |
| 2013/0119773 A1 * | 5/2013 | Davis | H02J 5/005 | 307/104 |
| 2013/0141037 A1 * | 6/2013 | Jenwatanavet | H02J 17/00 | 320/108 |
| 2013/0189926 A1 * | 7/2013 | Bangs | H04B 5/00 | 455/41.1 |
| 2013/0221913 A1 * | 8/2013 | Kim | H02J 7/0042 | 320/108 |
| 2013/0239958 A1 | 9/2013 | Persson | | |
| 2013/0289662 A1 * | 10/2013 | Olson | H02J 7/025 | 607/61 |

(56) References Cited

U.S. PATENT DOCUMENTS

| | | | | |
|---|---|---|---|---|
| 2014/0015522 | A1* | 1/2014 | Widmer | G01D 5/2006 324/239 |
| 2014/0028111 | A1* | 1/2014 | Hansen | H01F 38/14 307/104 |
| 2014/0074185 | A1* | 3/2014 | Fell | A61N 1/3787 607/61 |
| 2014/0085008 | A1* | 3/2014 | Cohen | H03F 1/0227 330/297 |
| 2015/0065045 | A1* | 3/2015 | Tsai | H04B 5/0037 455/41.1 |

OTHER PUBLICATIONS

STIC Search Report, by Benjamin Martin, Finished Oct. 15, 2015.*
"Why does a Circuit Always Have to Have Ground," Learning about Electronics [LAE], Published May 12, 2012, Accessed Online Mar. 2, 2016, https://web.archive.org/web/20120508181248/http://www.learningaboutelectronics.com/Articles/Why-does-a-circuit-always-have-to-have-ground.*

* cited by examiner

SYSTEM AND METHOD OF INDUCTIVE CHARGING AND LOCALIZATION THROUGH USING MULTIPLE PRIMARY INDUCTIVE COILS TO DETECT THE INDUCED VOLTAGE OF A SECONDARY INDUCTIVE COIL

BACKGROUND

Implantable medical devices such as cardiac pacemakers and defibrillators have become widespread. One common approach of powering implantable medical devices includes a DC current supplied by a battery. One type of battery is known as a primary cell and is not rechargeable. The average lifetime of a primary cell battery is five years and requires an invasive procedure to replace the battery. Another type of battery, known as a secondary cell, is rechargeable. Secondary cell batteries may be recharged thousands of times but generally hold no more than a few weeks of power. A secondary cell battery may last up to twenty years.

SUMMARY OF THE INVENTION

Aspects and embodiments generally relate to inductive recharging systems, and more specifically, to auto-locating a primary coil within operable proximity of a secondary coil.

According to certain aspects, it is appreciated that there are limitations in utilizing secondary cell batteries in implantable medical devices. One of the limitations of using a secondary cell battery is that a patient must comply with a specific procedure to recharge their implanted medical device. Often, these procedures require that a patient follow a rigorous recharging schedule. When recharging, a patient must remain relatively still in order for a recharging unit (e.g., a charging wand) to be properly aligned over the implanted device. Once aligned, the implanted device may be recharged through inductive coupling with a recharging unit. While many recharging units include data telemetry to confirm the proper alignment of a recharging head (e.g., via an audible beep from the recharging unit), these units must be held in proper alignment long enough to fully recharge the implanted device. As a result of these drawbacks, rechargeable implant devices have been disfavored over primary cell battery approaches.

Aspects and embodiments disclosed herein are directed to providing a recharging system that addresses the above limitations such as the inherent problem of patient compliance. Various embodiments disclosed herein include a system and method for recharging an implantable device by auto-locating an implanted device via wireless data telemetry (e.g., load shift keying), as discussed in more detail below. In some embodiments, a plurality of primary coils may be integrated into a fabric or other suitable non-conductive material and used to inductively transfer energy to a secondary coil associated with an implanted device.

At least one aspect described herein is directed to an inductive localization and charging system for detecting and charging a device comprising a plurality of primary inductive coils arranged within a dielectric material, an input connector coupled to the plurality of primary inductive coils and configured to receive input power, a controller coupled to the plurality of primary inductive coils and to the input connector, the controller configured to selectively activate each primary coil of the plurality of primary inductive coils, determine that a first primary coil of the plurality of primary inductive coils is within operable proximity of an external secondary coil located in the device, and control transfer of power between the primary coil and the secondary coil to charge the device.

According to one embodiment, the plurality of primary inductive coils are organized in an array, the array having rows and columns. In this embodiment, the plurality of primary inductive coils may be configured according to a modified star grounding configuration, wherein the array is comprised of a plurality of primary coil rows, and wherein each primary coil row of the plurality of primary coil rows is coupled to a common return line. In another embodiment, the plurality of primary inductive coils are organized in an array having a vestibule pattern. In still another embodiment, each primary coil of the plurality of primary inductive coils is wound opposite of adjacent primary coils.

According to another embodiment, each activated primary coil of the plurality of inductive coils is energized during a dwell time, and wherein the controller is further configured to measure a first voltage value for each activated primary coil of the plurality of primary inductive coils during the dwell time, determine if the first voltage value is above a reference threshold voltage, and set a flag indicating one or more activated primary coils is within operable proximity of a secondary coil in response to the determination that the first voltage value is above the threshold voltage.

In one embodiment the controller is configured to adjust the reference threshold voltage to increase sensitivity if the flag indicates no activated primary coil is within operable proximity of a secondary coil. In another embodiment, the controller is configured to adjust the reference threshold voltage to decrease sensitivity if the flag indicates two or more activated primary coils are within proximity of a secondary coil. In still another embodiment, the controller is further configured to decode a signal from an activated primary coil based on load shift keying (LSK). In this embodiment, the controller may be further configured to suspend the transfer of power to the secondary coil based on an LSK data transmission. In one embodiment, the dielectric material is a top sheet of a bed.

Another aspect described herein is directed to a method of detecting and charging a device including the acts of activating each primary coil of a plurality of primary inductive coils, determining that a first primary coil of the plurality of primary inductive coils is within operable proximity of an external secondary coil located in the device, and controlling a transfer of power between the primary coil and the secondary coil to charge the device.

According to another embodiment, activating each primary coil of the plurality of primary inductive coils further includes energizing each activated primary coil of the plurality of inductive coils during a dwell time, and wherein the method further comprises measuring a first voltage value for each activated primary coil of the plurality of primary inductive coils during the dwell time, determining if the first voltage value is above a reference threshold voltage, and setting a flag indicating one or more activated primary inductive coils is within operable proximity of a secondary coil in response to the determination that the first voltage value is above the threshold voltage.

In one embodiment, setting the flag further includes adjusting the reference threshold voltage to increase sensitivity if the flag indicates no activated primary coils is within operable proximity of a secondary coil. In another embodiment, setting the flag further includes adjusting the reference threshold voltage to decrease sensitivity if the flag indicates two or more activated primary coils are within proximity of a secondary coil. In still another embodiment, determining that a first primary coil of the plurality of primary inductive coils is within operable proximity of an external secondary coil further includes decoding a signal from an activated primary coil based on load shift keying (LSK).

In one embodiment, the method may further include the acts of determining that no activated primary coil is within operable proximity of a secondary coil, and suspending processing for a predetermined period of time.

One aspect described herein is directed to a bed sheet with an integrated inductive localization and charging system for detecting and charging a device comprising a plurality of primary inductive coils arranged within the bed sheet, an input connector coupled to the plurality of primary inductive coils and configured to receive input power, a controller coupled to the plurality of primary inductive coils and to the input, the controller configured to selectively activate each primary coil of the plurality of primary inductive coils, determine that a first primary coil of the plurality of primary inductive coils is within operable proximity of an external secondary coil located in the device, and control transfer of power between the primary coil and the secondary coil to charge the device.

In one embodiment, each activated primary coil of the plurality of primary inductive coils is energized during a dwell time, and wherein the controller is further configured to measure a first voltage value for each activated primary coil of the plurality of primary inductive coils during the dwell time, determine if the first voltage value is above a reference threshold voltage, and set a flag indicating one or more activated primary coils is within operable proximity of a secondary coil in response to the determination that the first voltage value is above the threshold voltage. In another embodiment, the device continues to draw a current from the primary coil after a secondary cell battery in the device has been fully recharged.

Still other aspects, embodiments, and advantages are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
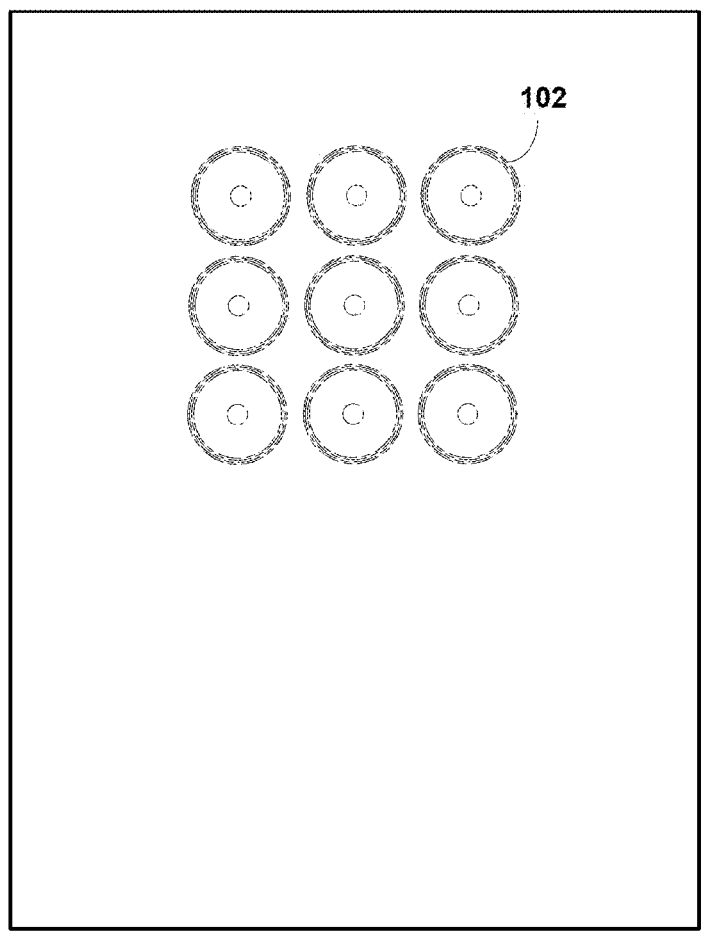
FIG. 1 is an illustration of one embodiment of an array of primary coils configured according to aspects of the present disclosure.

According to various aspects and embodiments, it is appreciated that implantable medical devices may include a secondary cell battery that may be configured to be recharged via an inductive charging device. Furthermore, recharging an implanted device typically requires that patients comply with a rigorous recharging schedule and procedure which restricts their movement during recharging procedures.

Aspects and embodiments are directed to providing a recharging system that includes an array of primary coils integrated within fabric or other suitable non-conductive material. One of the primary coils may be determined within operable proximity of a secondary coil and activated to begin transferring power through inductive coupling. Embodiments of the recharging system herein enable the automatic detection of a primary coil within proximity of a secondary coil through data telemetry (e.g., load shift keying). In one example, an array of primary coils may be woven into a sheet of fabric, such as a top sheet or bed sheet, in order to advantageously recharge an implanted device while a patient sleeps or is otherwise bedridden. In still other examples, an array of primary coils may be woven into other materials such as a laminate table top, plastic, or other non-conductive material.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment. Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring now to the drawings, FIG. 1 is an illustration of one embodiment of a primary coil array integrated into a sheet of fabric generally designated at 100. The sheet of fabric 100 may be comprised of any suitable fabric material which is non-conductive. The sheet of fabric 100 includes an array of primary coils 102 integrated into the sheet of fabric 100. As shown in FIG. 1, the array of primary coils 102 is in a 3×3 pattern. In other embodiments, the array of primary coils 102 may be larger (e.g., 5×5, 10×10, etc) or smaller (e.g., 2×2). In still other embodiments, the array of primary coils 102 may be configured in various patterns, not limited to a rectangular array as shown in FIG. 1. For example, in one embodiment the array of primary coils 102 may be ordered in a vestibule pattern in order to minimize the amount of dead space (i.e., non-detectable regions) between primary coils.

The array of primary coils 102 may be disposed in a manner which maximizes the potential of detecting, and coupling thereto, a secondary coil (not shown). For example, the sheet of fabric 100 may be a bed sheet in the form of a top sheet. In this example, the position of the array of coils 102 may be located substantially in the center (or top-center) of the sheet of fabric 100 so as to increase the potential of a primary coil being within operable range of a secondary coil (e.g., an implanted device), such as a pacemaker configured with a secondary cell battery within a patient's chest cavity. In other examples, two or more arrays of coils may be disposed in the sheet of fabric 100. As described further below with reference to FIG. 4B, the primary coils 102 may be arranged in the array such that the windings of adjacent primary coils are opposite (counter) so as to avoid cancellation of a resonant effect. The array of primary coils 102 may be coupled via a bus to a controller (not shown in FIG. 1) which enables activation, sensing, and coupling to a secondary coil of an implanted device. One example of a controller coupled to an array of primary coils is illustrated in FIG. 2A.

Figure 2:
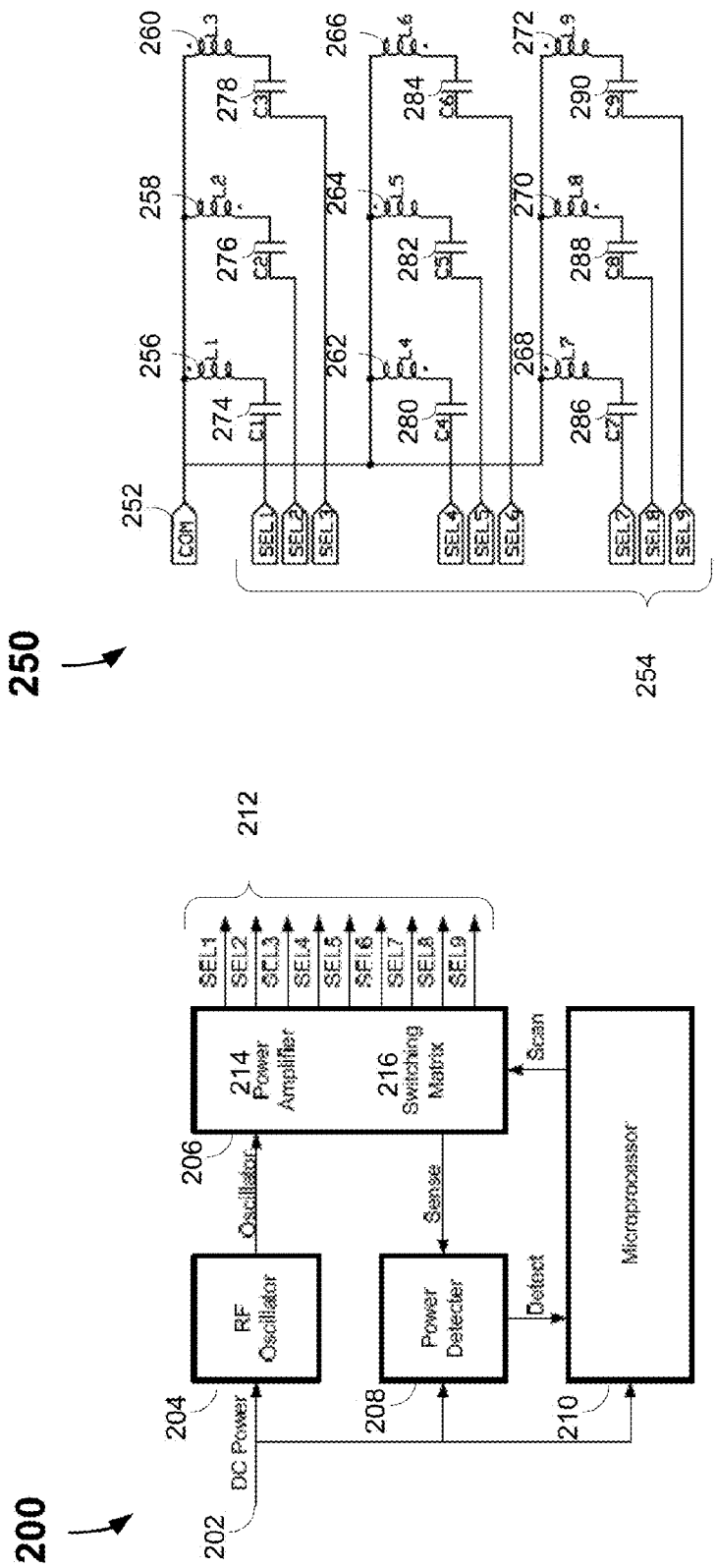
FIG. 2A is a block diagram of a recharging controller according to aspects of the present disclosure.
FIG. 2B is a schematic of a direct-address circuit for a plurality of primary coils according to one example of the present disclosure.

Referring to FIG. 2A, there is illustrated a block diagram of one example of a recharging controller 200 according to aspects of the present disclosure. The recharging controller 200 includes an input DC power line 202, an RF oscillator 204, a primary coil array controller 206, a power detector 208, a microprocessor 210, and coil address lines 212. The coil array controller 206 includes a power amplifier 214 and a switching matrix 216.

The microprocessor 210 may be configured to execute the auto-location processes of FIGS. 5 and 6 describe further below. In particular, the microprocessor 210 may be configured to direct the coil array controller 206 to supply power to each of the primary coils for the purpose of determining the presence of a secondary coil. If a secondary coil is detected within operable proximity of a primary coil, the microprocessor 210 may dwell on the primary coil for a predefined amount of time. Operable proximity, as used herein, is the maximum distance between a primary coil in parallel with a secondary coil before the secondary coil is undetectable. The maximum distance is a function of the composition of a primary coil and the value of an associated capacitor. In one embodiment, the maximum distance is 20 mm. In other embodiments, the maximum distance may be larger or smaller. Dwell time, as used herein, is a period of time that a primary coil remains energized by the primary coil array controller 206. A detection signal may be used to confirm the presence of a secondary coil. Detection signals are discussed further below with reference to FIG. 2B. If a detection signal is lost during a dwell time, the microprocessor 210 may continue to scan for a secondary coil in accordance with the auto-location methods of FIGS. 5 and 6.

Figure 5A:
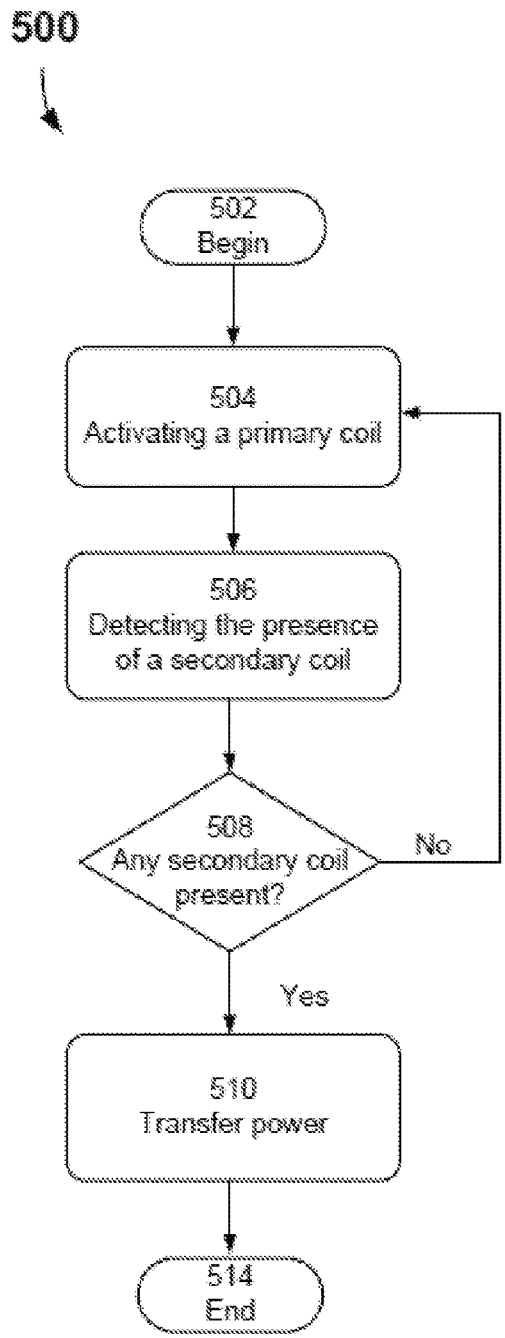
FIG. 5A is a diagram of an auto-location method according to various examples of the present disclosure.

The power detector 208 may be configured to measure a voltage drop by a selected primary coil which has been energized. A comparator arrangement within the power detector 208 may be configured to output a low voltage if the measured voltage drop is less than a reference threshold voltage and a high voltage if the voltage drop is greater than a reference threshold voltage. In one embodiment, the output voltage of the comparator arrangement is interpreted as a true or false condition by the microprocessor 210. For example, a high output voltage may be interpreted by the microprocessor 210 as indicating the presence of a secondary coil (i.e., a true condition). As described further below, the reference threshold voltage may be adjusted higher or lower during an auto-location process, such as the auto-location method 500 (FIG. 5A).

The RF oscillator 204 may be configured as a square wave generator which generates a signal that alternates between a low voltage and a high voltage. In one embodiment, the RF oscillator 204 is configured to output a square wave signal with a period of 1 microsecond. In this embodiment, the RF oscillator 204 may generate the square wave signal with a 50% duty cycle. As discussed further below, as the RF oscillator 204 drives a switching device closed a positive half-cycle AC waveform is generated through a selected primary coil.

Figure 3:
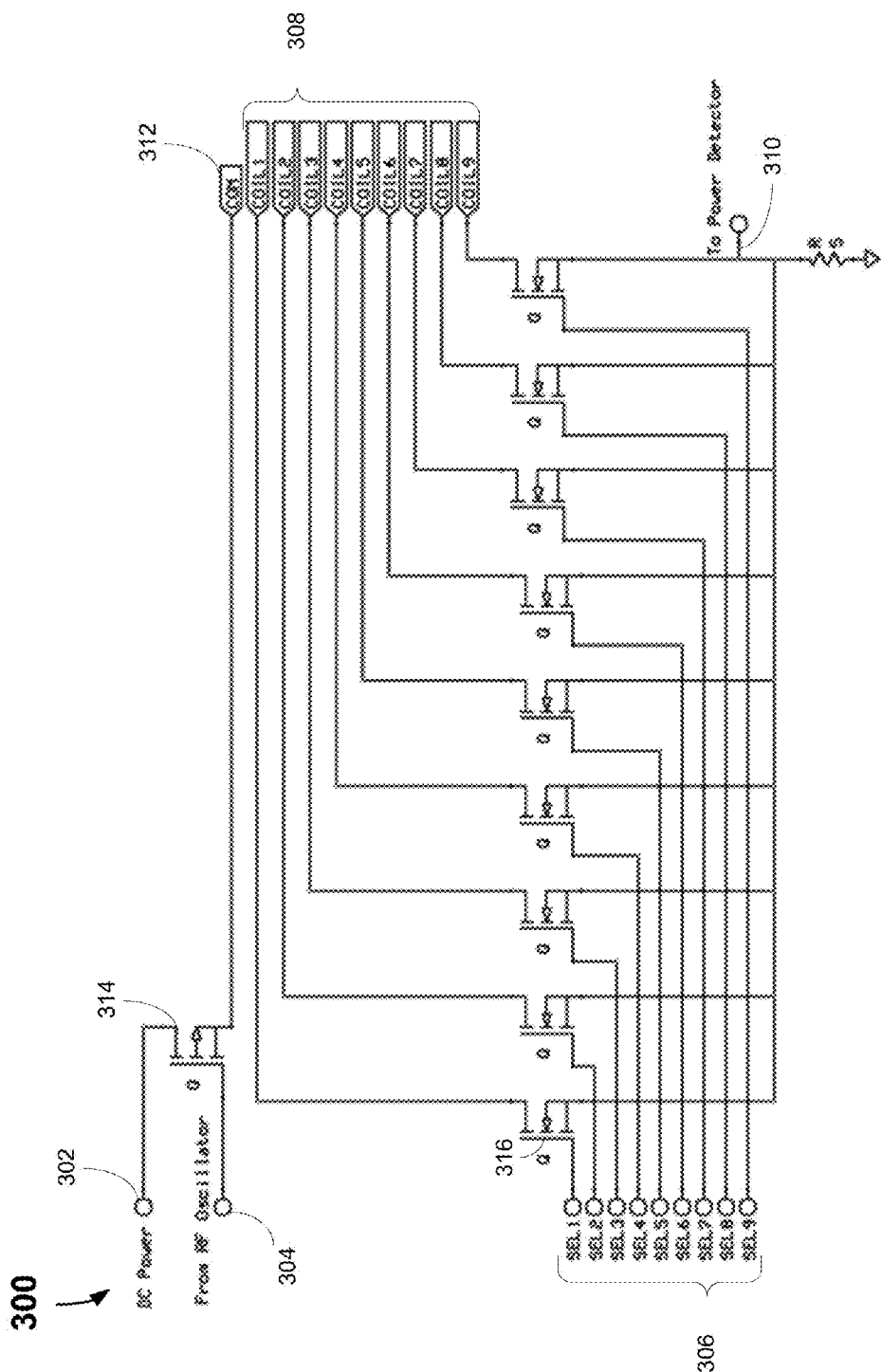
FIG. 3 is a schematic of a power amplifier and switching matrix according to one example of the present disclosure.

The coil array controller 206 includes a power amplifier 214 and a switching matrix 216 in conjunction with the RF oscillator 204 to drive a primary coil that has been selected by the microprocessor 210. One example of the power amplifier 214 and the switching matrix 216 is illustrated in FIG. 3. FIG. 3 illustrates an example direct-address circuit generally designated at 300. The direct-address circuit 300 includes a DC power line 302, an RF oscillator line 304, coil address lines 306, output coil lines 308, a power detector line 310, and a common line 312.

Referring again to FIG. 2A and to FIG. 3, the DC power line 302 may be coupled to the input DC power line 202 to receive DC power. The RF oscillator line 304 may be coupled to the RF oscillator 204 and configured to receive an oscillating signal (e.g., a square wave signal). The DC power line 302 may be coupled to a terminal of a switching device 314. A control pin of the switching device 314 may be coupled to the RF oscillator line 304. The switching device 314 may have another terminal coupled to a common line 312. A signal received from the RF oscillator 204, such as a square wave, may be used to drive the switching device 314 which may selectively couple the DC power line 302 to the common line 312. Each of the primary coil address lines 306 are coupled to a control pin of a switching device, such as the switching device 316. In the shown embodiment, the switching device 316 has a drain coupled to one of the output coil lines 308. A source of the switching device 316 may be coupled to the power detector line 310. The power detector line 310 may be coupled to the power detector 208 (FIG. 1). The coil address lines 306 may be coupled to the microprocessor 210 and be configured to receive a control signal. A control signal received from the microprocessor 210 at a coil address line 306 may cause, for example, switching device 316 to close. The closing of switching device 312 may cause a circuit to be completed between a primary coil (not shown) and the common line 312. To this end, a current in the form of an AC positive half cycle is conducted through the selected primary coil as the square wave received from the RF oscillator drives the switching device 314 open and closed. As discussed above with reference to FIG. 2A, during the dwell time (e.g., while the primary coil is energized), the power detector 208 may determine the presence or absence of a secondary coil based on measuring shifts in the load.

It will be appreciated by those skilled in the art, given the benefit of this disclosure, that the example direct-address circuit 300 may be replaced by other addressing circuits capable of selectively supplying current to a particular primary coil. For example, a circuit may be used wherein each primary coil of a primary coil array is addressed indirectly by row and column. A control signal may be provided to the circuit by the microprocessor 210 indicating a particular row and column value. The row and column value may correspond to a primary coil of a primary coil array.

FIG. 2B is a schematic of a circuit 250 including a plurality of primary coils. Referring to FIGS. 2A and 2B, the circuit 250 includes a common line 252, coil address lines 254, primary coils 256, 258, 260, 262, 264, 266, 268, 270 and 272, and capacitors 274, 276, 278, 280, 282, 284, 286, 288 and 290. The circuit 250 may be coupled to the recharging controller 200 via the coil address lines 212, as shown in FIG. 2A. Each line of the coil address lines 254 is coupled to a first end of one of the capacitors 274-290. A second end of each of the capacitors 274-290 is coupled to a first end of one of the coils 256-272, respectively. A second end of each of the coils 256-272 is coupled to the common line 252. In the shown embodiment, the circuit 250 uses a modified star grounding technique. According to a typical star grounding approach, each component is coupled individually to the common line 252. In the shown embodiment, the modified star grounding approach is utilized wherein each respective row of coils (e.g., the row of coils 256, 258, and 260) is coupled to the common line 252. Utilizing the modified star grounding technique reduces resistance of a resonant circuit, and thus, increases the quality and efficiency during power transfer.

As described below with reference to FIG. 4B, each of the primary coils 256-272 is wound in a direction that is opposite of adjacent coils. The counter-windings of each adjacent coil of the primary coils 256-272 advantageously eliminates the cancelling effects caused by two adjacent coils having the same winding direction.

In the example illustrated in FIG. 2B, the capacitors 274-290 are collocated with the primary coils 254-272 to reduce resistance in a resonant circuit formed by the primary coils 274-290 and the capacitors 274-290 when they are energized. As described further below with reference to FIG. 4B, a primary coil and a secondary coil may become magnetically coupled when their respective resonant circuits are operating at the same frequency and are within operable proximity.

In addition to wireless transmission of power discussed above, information may also be transmitted between a primary coil and a secondary coil via data telemetry. As used herein, data telemetry includes any suitable communication method allowing a recharging system, such as a recharging system implementing the recharging controller 200, to communicate wirelessly with an implanted device. In one embodiment, the recharging controller 200 may receive information from an implanted device via Load Shift Keying (LSK). LSK is a method of communication that allows an implanted device to communicate with a recharging system, such as a recharging system implementing the recharging controller 200 (FIG. 2A). In this embodiment, a load is varied on a secondary coil and the change in impedance is measured by the power detector 208. In the presence of a secondary coil, a primary coil will have a shifted load. A change in voltage caused by a shift in load may be compared against a reference threshold voltage and a true or false signal may be provided to the microprocessor 210 indicating whether a secondary coil is present.

In one embodiment, the recharging controller 200 is located externally to the primary coil array. For example, the fabric sheet 100 of FIG. 1 may include the circuit 250 (FIG. 2B) having a plurality of coils in a 3×3 pattern. The recharging controller 200 may be coupled to a power conversion device (i.e., a power adapter) and other circuitry. For this reason, it may not be feasible or desirable to have the recharging controller 200 collocated within the fabric sheet 100. Instead, the recharging controller 200 may be housed within an appropriately sized enclosure and coupled to the fabric sheet 100 via a cable. An advantage of this arrangement is that the active components may be accessed, serviced, and replace separately from the fabric sheet 100. Further, the circuit 250 integrated into the fabric sheet 100 may be configured with a minimal number of components to keep the costs of production low.

In another embodiment, the recharging controller 200 may be collocated with a primary coil array. In this embodiment, the recharging system 200 and the circuit 250 may be integrated in a non-conductive surface, such as a table top. In this embodiment, a device including a secondary coil (e.g., a cell phone, computer mouse, electric toothbrush, etc.) may be placed on top of the non-conductive surface. The recharging controller 200 may then locate a primary coil in operable proximity of a secondary coil and initiate recharging in accordance with the processes of FIGS. 5 and 6.

Figure 4A:
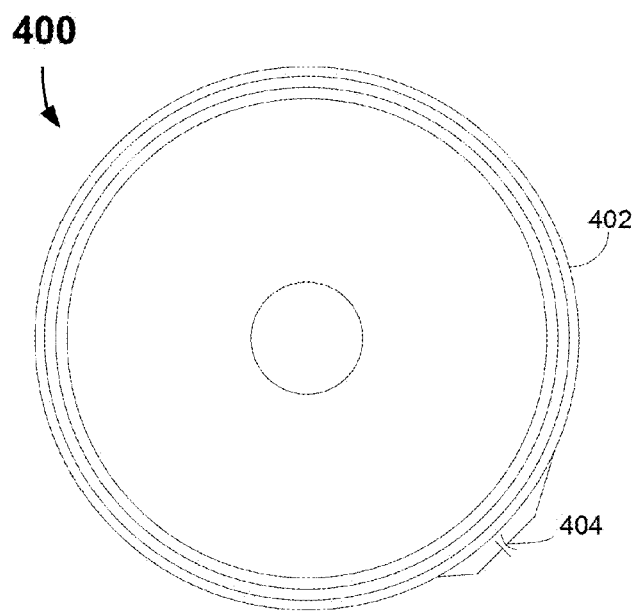
FIG. 4A is a diagram of a primary coil according to aspects of the present disclosure.

FIG. 4A is a diagram of an example primary coil 400. The primary coil 400 includes a number of windings 402 and a capacitor 404. In one embodiment, the primary coil 400 is 75 mm in diameter and may be comprised of twenty turns of enamel insulated magnet wire with a diameter of 0.01 mm. Twenty turns of the enamel insulated magnet wire results in a coil length of 0.2 mm. In this embodiment, the inductance of the primary coil 400 is approximately 63 µH. The quality of a resonant circuit (e.g., ability to transfer power) depends on the resistance of the circuit as being as low as possible. The resistance of the primary coil 400 is based on the wire used to form the coil, particularly, a gauge of the wire and material the wire is comprised of. A gauge of the wire may determine the coil's overall flexibility. In one embodiment, the wire may be a fine gauge copper wire. In other embodiments, the primary coil 400 may be comprised of a varying number of windings and materials based on a desired resonant frequency and a maximum operable distance.

As discussed above with reference to FIG. 2B, a resonant circuit generally includes a capacitive element coupled to the primary coil. Typically, capacitors have a small resistance and do not substantially impact the quality of the resonant circuit. However, the length of wire between a capacitor and a primary coil may negatively affect resonance. In the shown embodiment, the capacitor 404 is collocated directly with the primary coil 400 to mitigate adverse effects on resonance.

When a coil of the primary coil array 102 (FIG. 1) is energized an adjacent coil with an identical winding direction may cause undesirable magnetic interaction. For example, if a primary coil 256 (FIG. 2B) and an adjacent primary 258 (FIG. 2B) are wound in the same direction and the primary coil 256 is excited (i.e. energized) at a resonant frequency, the adjacent coil 258 will magnetically couple with the primary coil 256 and cancel out the resonant circuit. This phenomenon is a result of adjacent primary coils having identical lines of magnetic flux in opposite directions.

Figure 4B:
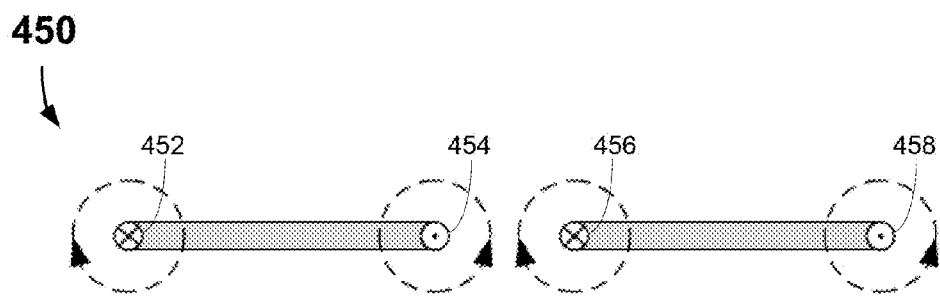
FIG. 4B is an illustration of adjacent primary coils according to aspects of the present disclosure.

FIG. 4B illustrates one embodiment of an array primary coils 450 in which adjacent primary coils are counter-wound. The array of primary coils 450 includes a first primary coil 452, a second primary coil 454, a third primary coil 456, and a fourth primary coil 458. In this embodiment, adjacent primary coils are counter-wound to enable primary coils to be disposed in an array, such as the primary coil array 102 (FIG. 1). In the shown embodiment, each of the primary coils 452-458 is wound opposite (counter) of adjacent coils. For example, the primary coil 454 is wound counter to the primary coil 456. Counter-wound primary coils ensure that adjacent primary coils have opposing electromagnetic lines of flux. As a result, energizing the primary coil 454 does not result in unintended electromagnetic interaction with the primary coil 456. In addition, counter-winding primary coils enables primary coils to be placed in close proximity to minimize any detection dead-space within the array of primary coils 102.

As described above with reference to FIG. 2A, several embodiments perform processes that locate a primary coil that is within operable proximity of a secondary coil. In some embodiments, these auto-location processes are executed by a recharging system, such as a recharging system implementing the recharging controller 200 described above with reference to FIG. 2A. One example of such an auto-location process 500 is illustrated in FIG. 5A. According to this example, the auto-location process 500 includes the acts of activating a primary coil, detecting the presence of a secondary coil, determining if a second coil is present, and transferring power via inductive coupling. The method begins in act 502.

In act 504, the recharging controller 200 (FIG. 2A) activates a first coil of a primary coil array, such as the primary coil array 102 of FIG. 1. In one embodiment, the primary coil array 102 may be configured with a circuit which couples each coil of the primary coil array in a modified star grounding arrangement, such as the circuit 250 of FIG. 2B. In this embodiment, a microprocessor, such as the microprocessor 210 may initiate a control signal to a primary coil array controller, such as the primary coil array controller 206, to selectively energize a first primary coil of the primary coil array. In accord with the direct-addressing circuit 300 of FIG. 3, the control signal may be received via one of the coil address lines 306. Responsive to a voltage present on one of the coil address lines 306, a switching device, such as the switching device 316 (FIG. 3) may change state (e.g., switch on). When the switching device 316 is switched on, a circuit may be completed between a primary coil line 308 (FIG. 3) and the common line 312 (FIG. 3). In this instance, a current in the form of an AC positive half cycle is generated based on a signal (e.g., a square wave) received via the RF oscillator line 304 which drives the switching device 314 open and closed. As described above with reference to FIG. 2B, each coil address line of the coil address lines 308 may be coupled to the coil address lines 254 of FIG. 2B. In addition, each coil address line of the coil address lines 254 may be coupled to a capacitor and primary coil, respectively. To this end, a selected primary coil is then coupled to the common line 252 and receives the current. As described above with reference to FIG. 2B, one or more coils may be coupled to a common line in accordance with a modified star grounding approach. A modified star grounding approach may advantageously eliminate resistance within a resonant circuit formed by an energized primary coil and capacitive element. It will be understood by one skilled in the art, and having the benefit of this disclosure, that only a single control line may be used to activate a selected primary coil according to embodiments disclosed herein.

In one embodiment an indicator may be used to provide visual feedback based of the activation step of the act 504. For example, as each primary coil is activated an LED may be illuminated to indicate which primary coil is being activated. In other examples, an LED may be illuminated to indicate the transfer of power between a primary coil and a secondary coil.

In act 506, an activated primary coil is energized for a period of time (i.e., the dwell time). In one embodiment, the dwell time may be a predefined value stored in the microprocessor 102. In other embodiments, the dwell time may be adjusted during the auto-location process 500. The dwell time may be a function of the selected data telemetry method. For example, the recharging system 200 may be configured to decode LSK. In this example, a dwell time may be a multiple of the shortest detection period. In certain examples, a 3 millisecond period may be utilized to successfully detect an LSK data transmission. Thus, the recharging controller 200 may be configured with a dwell time as short as the minimum time to detect the LSK data transmission, or set to two or three times the minimum time required.

As described above with reference to FIG. 2A, the power detector 208 may be coupled to the primary coil array controller 206 and used to determine if a detection signal is present. In one embodiment, a secondary coil may be detected by measuring a change in impedance in the resonant circuit formed by the activated primary coil and a secondary coil within operable proximity. For example, the power detector 208 may be coupled to the common line 252 and measure a shift in load (e.g., voltage). In one embodiment, the power detector 208 may measure a drop in voltage which would be indicative of a proportional amount of current being consumed by the activated primary coil (e.g., a secondary coil being present). In this embodiment, the power detector 208 may comprise a comparator which outputs a low voltage if a measured voltage drop is less than the reference threshold voltage (e.g., no detected secondary coil) and a high value is the measured voltage drop is greater than the reference threshold voltage (e.g., a secondary coil may be detected). The microprocessor 210 may interpret the output voltage as a logical true or false and determine the presence of a secondary coil. In one embodiment, a secondary coil may initially be disposed within operable proximity of the activated primary coil and later removed from operable range. In this embodiment, the microprocessor may determine that a secondary coil is no longer detected and return to the act 502 and resume scanning.

In act 508, the charging system 200 determines if a secondary coil has been detected. In one embodiment, the presence of any secondary coil may cause the charging system 200 to continue to act 510 and subsequently transfer power. In another embodiment, the charging system 200 may return to act 504 and continue to detect whether any additional secondary coils are present. In this embodiment, the presence of multiple secondary coils may indicate that the reference threshold voltage is too low (e.g., too sensitive). As a result the microprocessor 210 may increase the reference threshold voltage and return to act 502.

If no secondary coils were detected in the act 506, or if the charging system 200 activates each primary coil before continuing to act 510, the recharging system 200 (FIG. 2B) may return to act 504.

Figure 6:
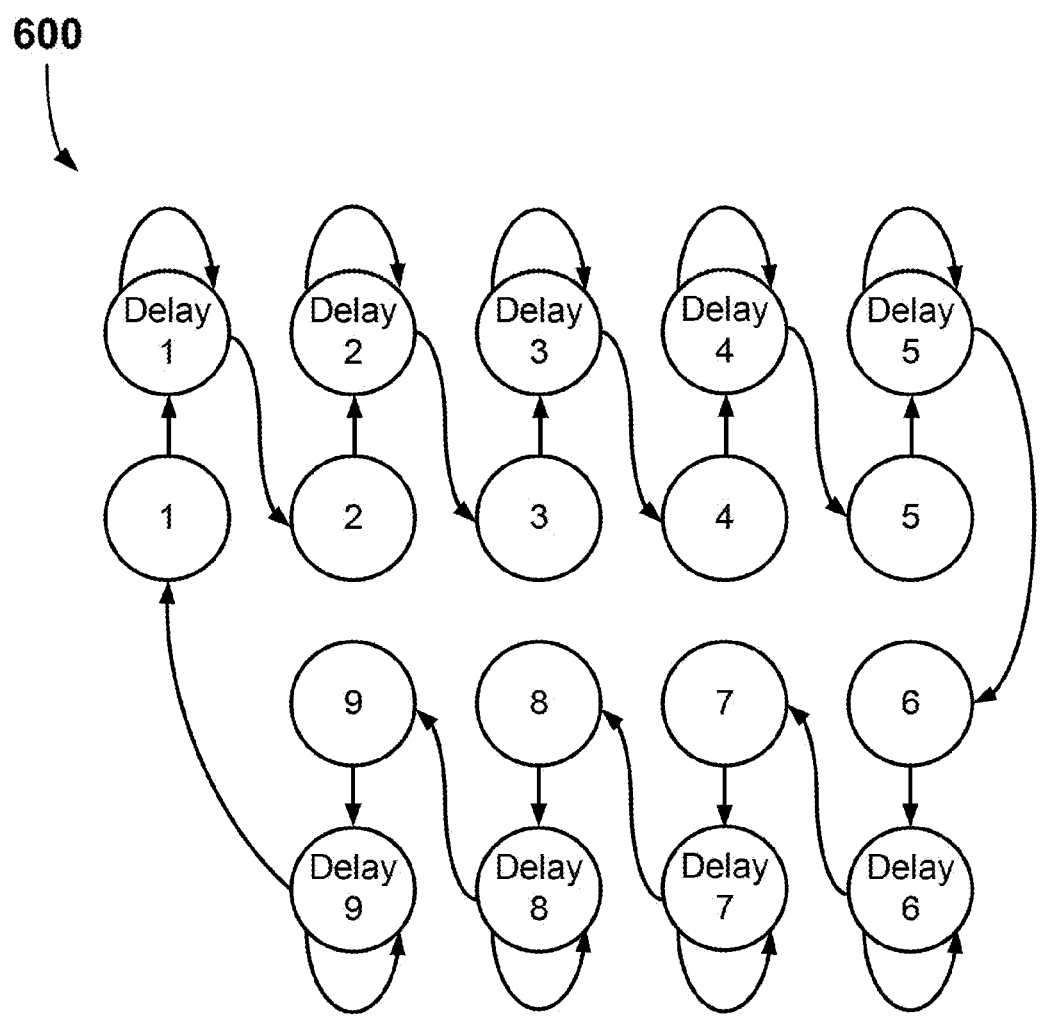
FIG. 6 is a diagram of an auto-location method according to one example of the present disclosure.

FIG. 6 is a diagram of an auto-locating method 600 according to one embodiment. Prior to returning to act 504, the microprocessor 210 may select another primary coil to activate based on a sequential pattern. In the shown embodiment, the auto-locating method 600 includes incrementing a counter and selecting another primary coil to activate in the act 504. In this embodiment, the microprocessor may wait a predefined amount of time (delay) to allow a previously activated coil to decay (e.g., discharge) before activating another primary coil.

In one embodiment, the microprocessor 210 may determine that each of the primary coils has been activated and no secondary coil has been detected. Prior to rolling over the counter (e.g., returning to a value representing the first primary coil), the microprocessor 210 may cause a sleep to occur for a predefined amount of time. For example, the microprocessor 210 may initiate a sleep of 500 milliseconds. In one embodiment, the microprocessor 210 may shutdown the power amplifier 214 or other power-consuming components of the recharging controller 200 during the sleep period. In still further embodiments, the microprocessor 210 may enter a low power mode and awaken after the predefined sleep period. In some embodiments, the microprocessor 210 may wait until a number of scans have occurred and no secondary coil has been detected prior to entering a sleep period. In these embodiments, the number of scans prior to entering the sleep period may be predefined and stored in the microprocessor 210.

In at least one embodiment, the microprocessor may adjust the threshold reference voltage if no secondary coils are detected after one or more scans. In these embodiments, the microprocessor 210 may adjust a threshold reference voltage down to increase sensitivity. In one embodiment, the reference threshold voltage may be adjusted up if two or more primary coils are detected in subsequent scans.

In act 510, the recharging controller 200 energizes a primary coil while the secondary coil is present (e.g., the power detector 208 indicates the presence of a secondary coil). As discussed above, if the secondary coil is no longer detected (e.g., the power detector 208 indicates the secondary coil is no longer present) the recharging controller 200 may return to act 504. In one embodiment, the recharging controller 200 may continue to energize the activated primary coil until the secondary coil indicates that a secondary cell battery associated with the secondary coil is fully charged. For instance, an implanted device may communicate to the recharging controller 200 that a battery is fully recharged based on a LSK data transmission. In still other embodiments, the charging system 200 may continue to transfer power to the secondary coil for an indefinite amount of time. For example, an implanted device may bypass a battery and power the device directly from the induced current. The method ends in act 512.

Figure 5B:
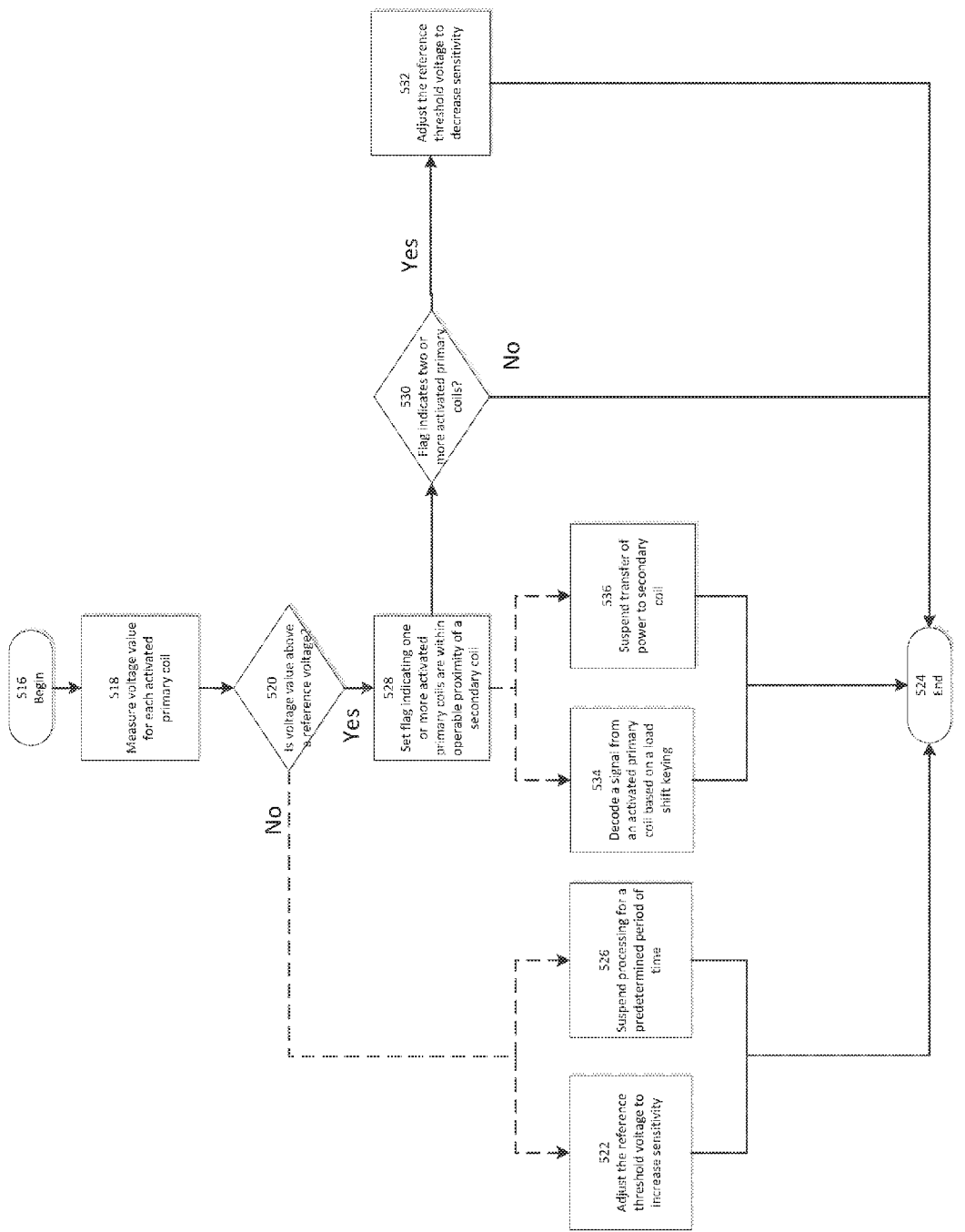
FIG. 5B is a diagram of an auto-location method according to various examples of the present disclosure.

FIG. 5B is a diagram illustrating additional acts of an auto-location method according to various examples of the present disclosure. In act 518, each activated primary coil of a plurality of inductive coils is energized during a dwell time and a controller is configured to measure a first voltage value for each activated primary coil of the plurality of primary inductive coils during the dwell time. In act 520, the controller is configured to determine if the first voltage value is above a reference threshold voltage. In act 528, in response to a determination that the first voltage value is above the threshold voltage, the controller sets a flag indicating one or more activated primary coils is within operable proximity of a secondary coil.

According to one embodiment, in act 522, the controller is configured to adjust the reference threshold voltage to increase sensitivity if the flag indicates no activated primary coil is within operable proximity of a secondary coil. According to one embodiment, in act 532, the controller is configured to adjust the reference threshold voltage to decrease sensitivity if the flag indicates (e.g., in act 530) two or more activated primary coils are within proximity of a secondary coil. According to one embodiment, in act 534, the controller is further configured to decode a signal from an activated primary coil based on load shift keying (LSK). According to one embodiment, in act 536, the controller is further configured to suspend the transfer of power to a secondary coil based on an LSK data transmission. According to one embodiment, in act 526, the controller is further configured to determine that no activate primary coil is within operable proximity of a secondary coil and suspend processing for a predetermined period of time.

Figure 7:
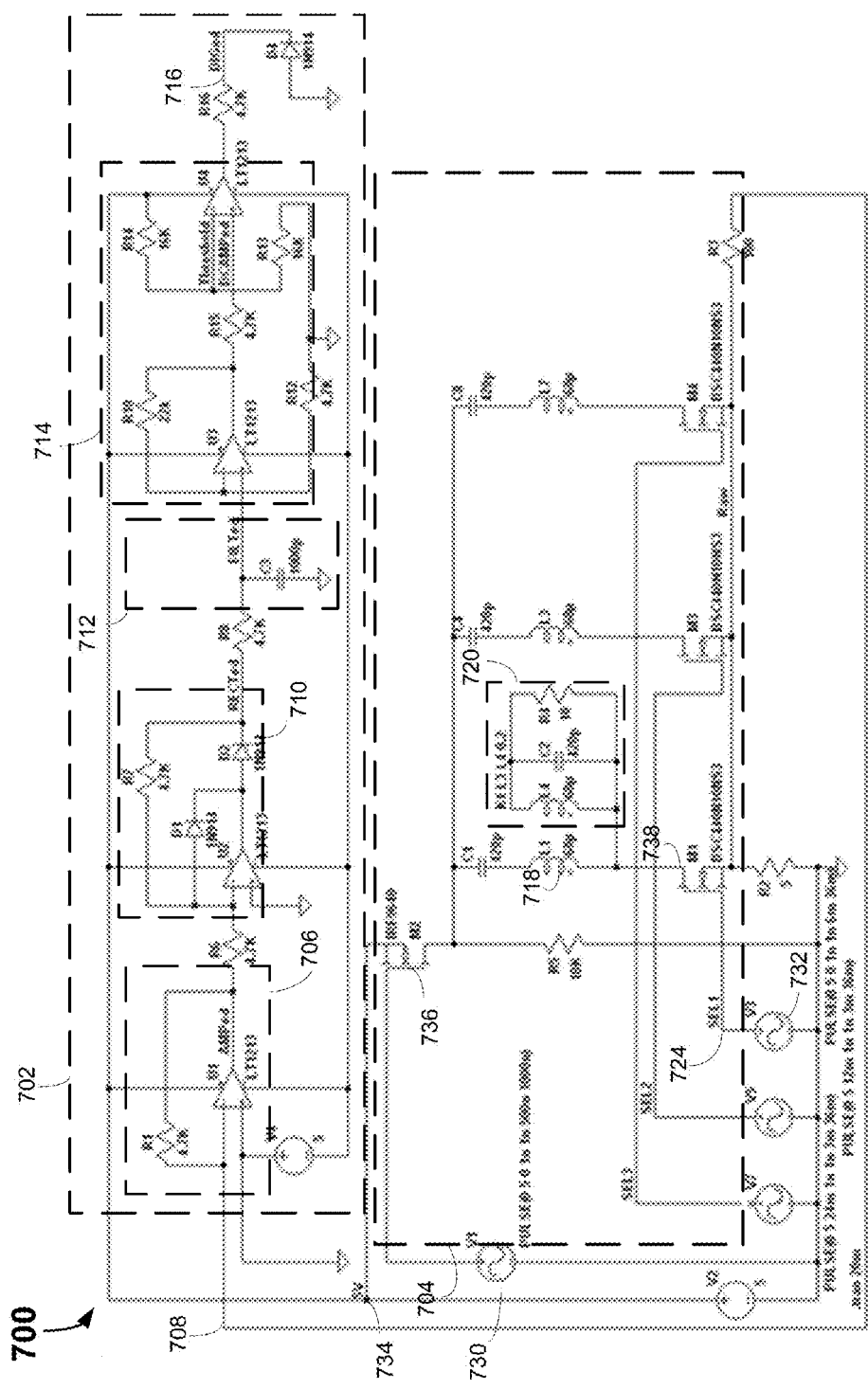
FIG. 7 is a schematic diagram of a simulation circuit according to aspects of the present disclosure.
Figure 8:
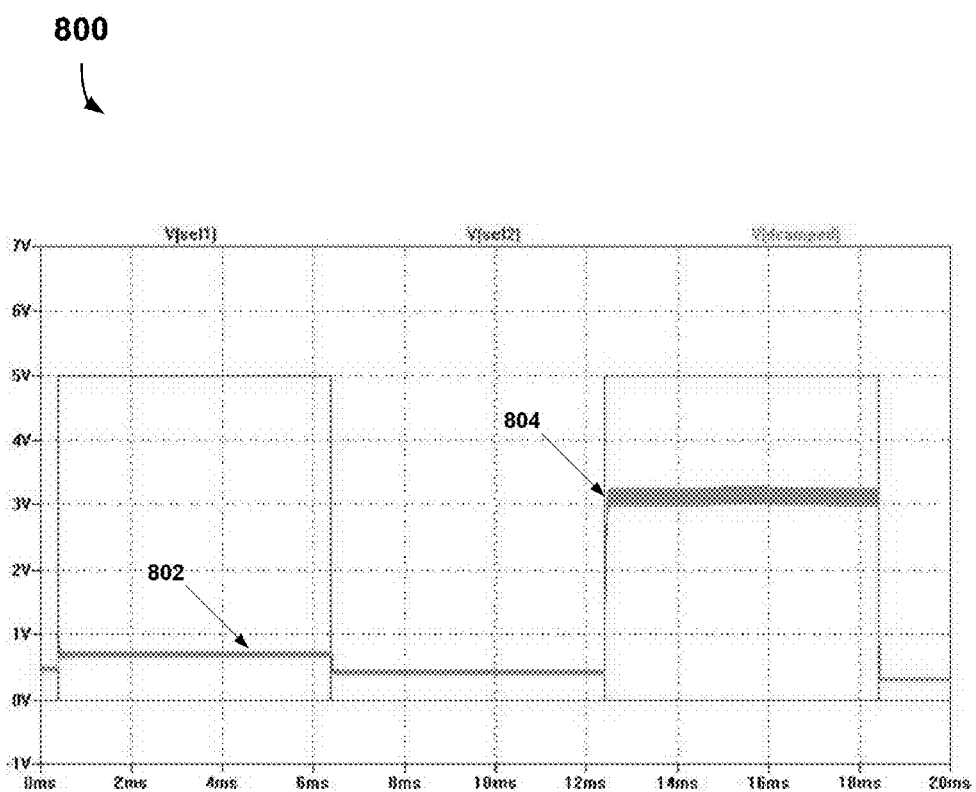
FIG. 8 is a graph of measurements at various terminals of the simulation circuit of FIG. 7 according to aspects of the present disclosure.
Figure 9:
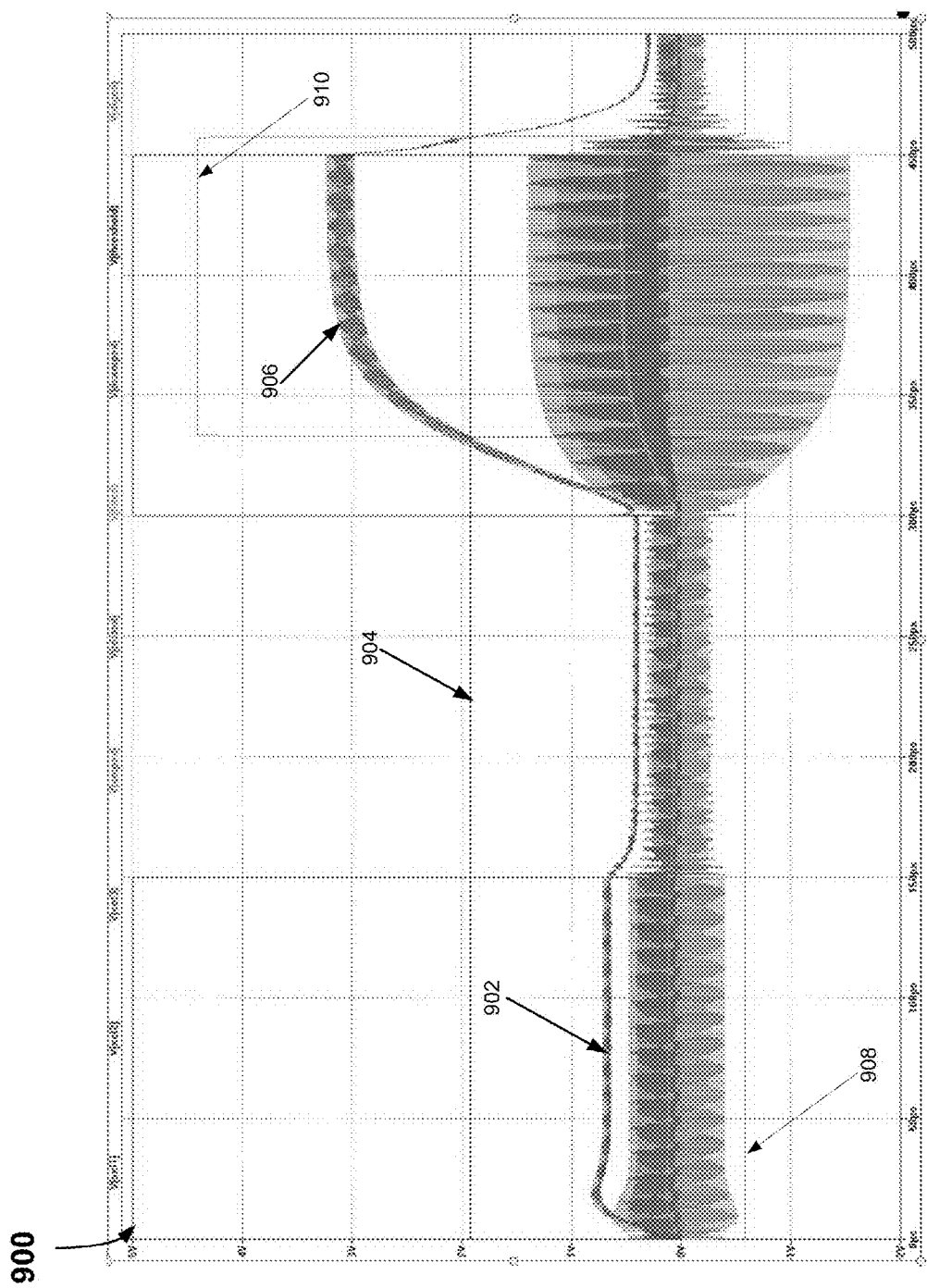
FIG. 9 is a graph illustrating detection of a secondary coil based on the simulation circuit of FIG. 7.

FIGS. 7-9 are directed to a simulation performed to demonstrate, by way of example, the operation of the auto-location and charging methods discussed herein. A simulation circuit model discussed below with reference to FIG. 7. Results of the simulation are discussed below with reference to FIGS. 8 and 9.

Referring now to FIG. 7, a schematic diagram of a simulation circuit model 700 is illustrated according to aspects of the present disclosure. The simulation circuit 700 includes a power detector circuit 702 and a primary coil array circuit 704. The power detector circuit 702 includes a first amplification arrangement 706 to amplify a voltage drop in a current provided by an output 708 of a selected primary coil circuit 704, a rectifier arrangement 710 to produce a positive signal, a low-pass filter 712 to convert the positive signal to a direct current, a second comparator arrangement 714 to amplify the positive signal to a reference threshold voltage, and an output 716 configured to output a DC voltage indicating whether a secondary coil is present.

As discussed above with reference to FIG. 2A, the power detector 208 may be coupled to an output of a primary coil array via the coil address lines 212 and configured to determine the presence of a secondary coil. The power detector circuit 702 determines the presence of a coil by first receiving a signal from the output 708 of the primary coil array. The signal is then amplified and rectified by the first amplification arrangement 706 and the rectifier arrangement 710. The rectified signal is then filtered through the low-pass filter 712 to convert the rectified signal into a direct current. The filtered signal is then amplified and subsequently compared by the second amplification arrangement 714 to a reference threshold voltage. As discussed above with reference to the FIGS. 2A and 5, the reference threshold voltage may be adjusted during operation of the recharging controller 200. In the shown embodiment, the output 716 of the second comparator arrangement 714 may be configured as a digitally compatible DC signal. For example, as shown in FIG. 8, a graph view 800 of a probe coupled to the output 716 is illustrated. The graph view includes a first DC voltage 802 corresponding to a primary coil address of the primary coil circuit 704 and a second DC voltage 804 corresponding to the output 716 of the second comparator arrangement 714. In the shown embodiment, the second DC voltage 804 is measured at 3V when the selected primary coil is within operable proximity of a secondary coil. The second DC voltage 804 may be interpreted as a logical true or false by a microprocessor, such as the microprocessor 210 of FIG. 2A.

Returning to FIG. 7, the primary coil circuit array 704 includes a first primary coil 718 and a simulated load 720 coupled to the first primary coil. In the shown embodiment, the presence of a secondary coil is simulated when the first primary coil 718 is energized. As discussed above with reference to FIGS. 2A, 2B and 3, a signal may be provided by the RF oscillator 204. In the embodiment shown, a pulse generator 730 generates a comparable signal to the RF oscillator 204. Another signal generator 732 generates a signal comparable to a signal generated by the microprocessor 210. When the first primary coil 718 is selected via a signal from the signal generator 732 (e.g., a rising edge of a square wave) a switching device 738, in tandem with the switching device 736, energize the first primary coil 718 with a current received via a DC source 734. While the current energizes the primary coil 718, the simulated load 720 acts as a load and draws a current. The output 708 of the primary coil array circuit 704 is then measured via the power detector circuit 702 to positively determine the presence of the simulated load 720.

FIG. 9 is a graph 900 illustrating detection of a secondary coil based on the simulation circuit 700. The graph 900 includes a first current measurement 902, a reference threshold voltage 904 and a second current measurement 906. In the shown embodiment, the first current measurement value 902 illustrates a current value which is below the reference threshold voltage 904, and thus, the absence of a secondary coil. Accordingly, the output 716 of the power detector circuit 702 measures at −0.5V as indicated at 908. As described above with reference to FIG. 8, the output 716 may be interpreted as a digital signal by a microprocessor, such as the microprocessor 210 (FIG. 2A) and may correspond to a logical true or false condition. In the presence of a secondary coil, the second current measurement 906 measures above the reference threshold voltage 904. In this instance, the output 716 of the power detector 702 measures at +4V (logic high) as indicated at 910. As demonstrated by the simulation circuit 700, a secondary coil may be successfully located by determining a primary coil within operable proximity based on the embodiments disclosed herein.

Various embodiments of systems and methods disclosed herein may have applications in various fields. Applications may encompass the field of medical implant devices. For example, embodiments may include a primary coil array being integrated into a top sheet of a bed. A patient's implanted device may be located and recharged in accordance with aspects and embodiments described above. Other examples of applications may include surface-top recharging for consumer electronics such as various computing devices and mobile communications devices. For example, a non-conductive table-top surface may have an integrated primary coil array and controller configured to locate a primary coil within operable proximity of a device placed on the table-top surface.

Various embodiments disclosed herein provide several advantages. One advantage is that by auto-locating a primary coil within operable proximity of a secondary coil mitigates the restriction of a patient's freedom during recharging operations. Various embodiments may allow such recharging operations to occur while a patient is asleep or otherwise immobile. As described above with reference to various embodiments, the layout of a primary coil array may be configured in various patterns with primary coils spaced minimally apart to reduce dead space in a detectable area. In accordance with these embodiments, primary coils may be wound in a direction counter to that of adjacent primary coils. One advantage of counter-wound primary coils is the elimination of canceling effects on the resonant circuit. Yet another advantage is reduction of resistance and noise by configuring a primary coil array to utilize a modified star grounding approach.

According to other aspects, various methods of auto-locating a primary coil within operable proximity of a secondary coil disclosed herein are within the scope of this disclosure. In one example, a method of scanning a primary coil array, such as the primary coil array 102 described above with reference to FIGS. 5 and 6 is provided. Scanning the primary coil array may include selecting and energizing each primary coil for a period of time to measure changes in a load. One or more data telemetry approaches may be used, such as LSK, to determine the presence of a secondary coil. In various embodiments, LSK may be also used to eliminate the potential of false positives during detection of secondary coils. In still other embodiments, a reference threshold value may be adjusted up or down to increase or decrease detection sensitivity.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

The invention claimed is:

1. An inductive localization and charging system for detecting and charging a device, the system comprising:
   a plurality of primary inductive coils arranged within a dielectric material;
   an input connector coupled to the plurality of primary inductive coils and configured to receive input power;
   a controller coupled to the plurality of primary inductive coils and to the input connector, the controller configured to:
      selectively activate each primary coil of the plurality of primary inductive coils during a dwell time;
      measure a first voltage value for each activated primary coil of the plurality of primary inductive coils during the dwell time;
      determine whether the first voltage value is above a reference threshold voltage;
      set a flag indicating one or more activated primary coils is within operable proximity of a secondary coil in response to the determination that the first voltage value is above the reference threshold voltage;
      adjust the reference threshold voltage to decrease sensitivity in response to the flag indicating that two or more activated primary coils are within proximity of a secondary coil;
      determine that a first primary coil of the plurality of primary inductive coils is within operable proximity of an external secondary coil located in the device; and
      control transfer of power between the first primary coil and the secondary coil to charge the device.

2. The system of claim 1, wherein each primary coil of the plurality of primary inductive coils is wound opposite of adjacent primary coils.

3. The system of claim 1, wherein the controller is configured to adjust the reference threshold voltage to increase sensitivity in response to the flag indicating that no activated primary coil is within operable proximity of a secondary coil.

4. The system of claim 1, wherein the controller is further configured to decode a signal from an activated primary coil based on load shift keying (LSK).

5. The system of claim 1, wherein the controller is further configured to suspend the transfer of power to the secondary coil based on an LSK data transmission.

6. The system of claim 1, wherein the dielectric material is a top sheet of a bed.

7. The system of claim 1, wherein the plurality of primary inductive coils are organized in an array, having rows and columns.

8. The system of claim 7, wherein the plurality of primary inductive coils are configured according to a modified star grounding configuration, wherein the array is comprised of a plurality of primary coil rows, and wherein each primary coil row of the plurality of primary coil rows is coupled to a common return line.

9. A method of detecting and charging a device, the method comprising:
- activating each primary coil of a plurality of primary inductive coils during a dwell time;
- measuring a first voltage value for each activated primary coil of the plurality of primary inductive coils during the dwell time;
- determining whether the first voltage value is above a reference threshold voltage;
- setting a flag indicating one or more activated primary inductive coils is within operable proximity of a secondary coil in response to the determination that the first voltage value is above the reference threshold voltage;
- adjusting the reference threshold voltage to decrease sensitivity in response to the flag indicating that two or more activated primary coils are within proximity of a secondary coil;
- determining that a first primary coil of the plurality of primary inductive coils is within operable proximity of an external secondary coil located in the device;
- controlling a transfer of power between the first primary coil and the secondary coil to charge the device.

10. The method of claim 9, wherein setting the flag further includes adjusting the reference threshold voltage to increase sensitivity in response to the flag indicating that no activated primary coils is within operable proximity of a secondary coil.

11. The method of claim 9, wherein determining that a first primary coil of the plurality of primary inductive coils is within operable proximity of an external secondary coil further includes decoding a signal from an activated primary coil based on load shift keying (LSK).

12. The method of claim 9, the method further comprising:
- determining that no activated primary coil is within operable proximity of a secondary coil; and
- suspending processing for a predetermined period of time.

* * * * *